Figures 1A, 1B:
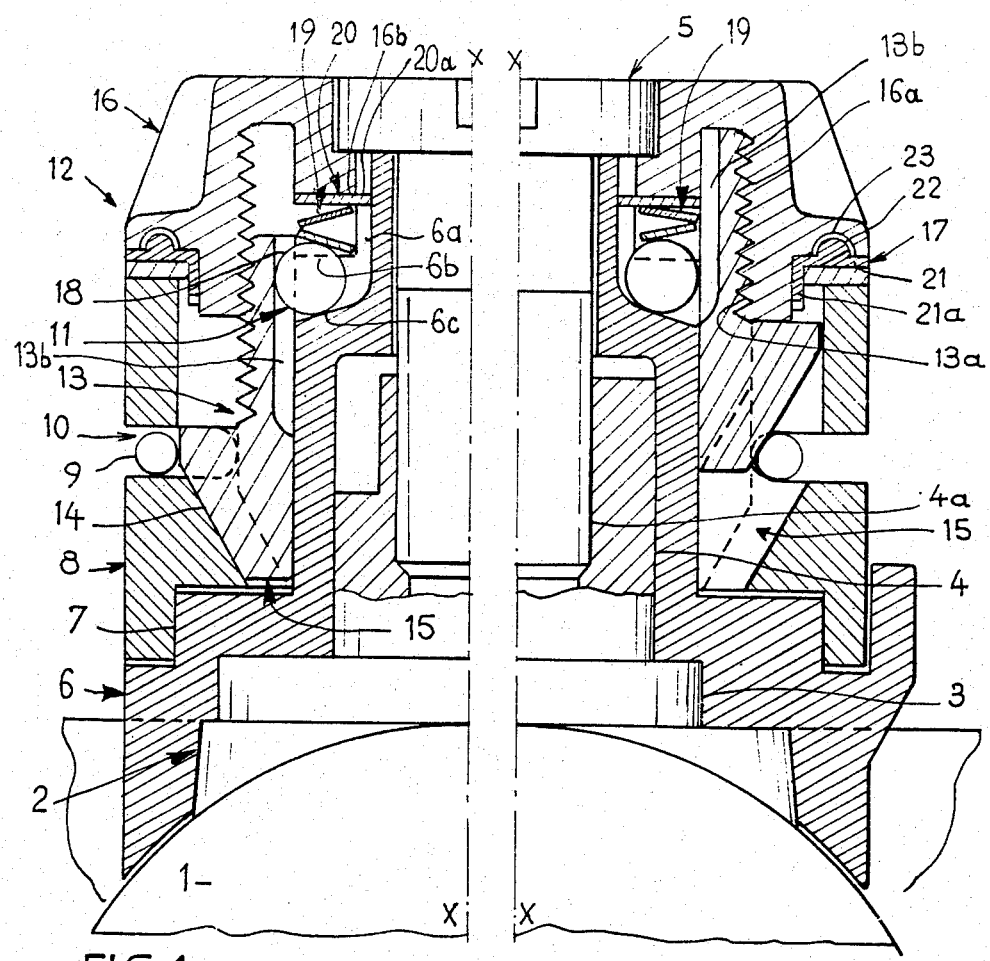

United States Patent [19]

Sinoquet

[11] Patent Number: 4,828,535
[45] Date of Patent: May 9, 1989

[54] INDEXING CONTROL DEVICE FOR A CYCLE DERAILLEUR

[75] Inventor: Regis Sinoquet, Fressenneville, France

[73] Assignee: Sachs-Huret S.A., Nanterre, France

[21] Appl. No.: 116,284

[22] Filed: Nov. 2, 1987

[30] Foreign Application Priority Data

Nov. 27, 1986 [FR] France .................... 86 16568

[51] Int. Cl.⁴ ............................................. F16H 11/00
[52] U.S. Cl. ......................................................... 474/80
[58] Field of Search .................. 474/69, 70, 78, 80, 474/81, 82

[56] References Cited

U.S. PATENT DOCUMENTS 4,690,662 9/1987 Nagano .................... 474/78 X

FOREIGN PATENT DOCUMENTS

| 0157983 | 10/1985 | European Pat. Off. |
| 2551569 | 3/1985 | France |
| 2579163 | 9/1986 | France |
| 2578507 | 9/1986 | France |

Primary Examiner—Thuy M. Bui
Attorney, Agent, or Firm—Richard Busnell

[57] ABSTRACT

A control device is disclosed operable by a rotatable control lever having an actuating cable attached thereto and received in a groove with a mechanism for determining index positions of the lever and for adjusting the radial distance between the bottom of at least a portion of the groove and an axis of rotation of the lever. The adjustment is accomplished by a chuck interposed between a support for the lever and connected to rotate with the lever. The chuck includes at least one projecting portion having variable cross sections adaped to engage in a cavity in the lever so as to constitute the bottom of the adjustable portion of the groove. The chuck is mounted to be axially movable relative to the support of the section of a control knob.

11 Claims, 1 Drawing Sheet

INDEXING CONTROL DEVICE FOR A CYCLE DERAILLEUR

The present invention relates to a control device for a cycle derailleur.

Many control devices are known in the art for cycle derailleurs comprising a support adapted to be fixed to a part of the frame or of the handlebars of the cycle and on which is rotatively mounted a control lever connected to one end of an actuating cable whose other end is connected to a derailleur.

Two main types of control devices exist, the devices of the first type being provided with friction means disposed between the lever and the support, and the devices of the other type being provided with indexing means between these elements. These indexing means comprise notches or like means which determine with precision different positions of the lever corresponding to the establishment of different transmission ratios. These indexed positions are determined in accordance with various parameters, and in particular the pitch between the sprockets of the freewheel, so that when a freewheel is mounted whose sprockets have a pitch different from that originally provided, the indexing means of such a control device can no longer be used.

Therefore, a third type of control device has been proposed, which is a combination of the two aforementioned types. These devices enable the user to select as desired the operation of the lever, either with indexation of the various ratios, or with friction.

However, this has resulted in relatively complex assemblies and this complexity may result in lack of reliability and a relatively high cost.

An object of the invention is therefore to solve the problems mentioned hereinbefore by proposing a control device for a cycle derailleur which is simple, reliable, cheap and easily adaptable to freewheels whose sprockets have different pitches.

The invention therefore provides a control device for a cycle derailleur comprising a support adapted to be fixed to a part of the frame or of the handlebar of the cycle, a control lever which is rotatable about the axis of the support, an actuating cable attached on said lever and received in a groove of the latter, and first indexing means determining indexed positions of the lever relative to the support, said device further comprising means for adjusting the radial distance between the bottom of at least a portion of the groove and the axis of the support.

Advantageously, the adjusting means comprise a chuck interposed between the support and the lever, connected to rotate with the lever, and including at least one projecting portion having a variable cross-section adapted to be engaged in a corresponding cavity provided in the lever, and with which the groove communicates, so as to constitute the bottom of said adjustable portion of the groove, said chuck being axially movably mounted relative to the support under the action of a control knob for adjusting the radial distance between the bottom of said groove portion and the axis of the support.

Figure 2:
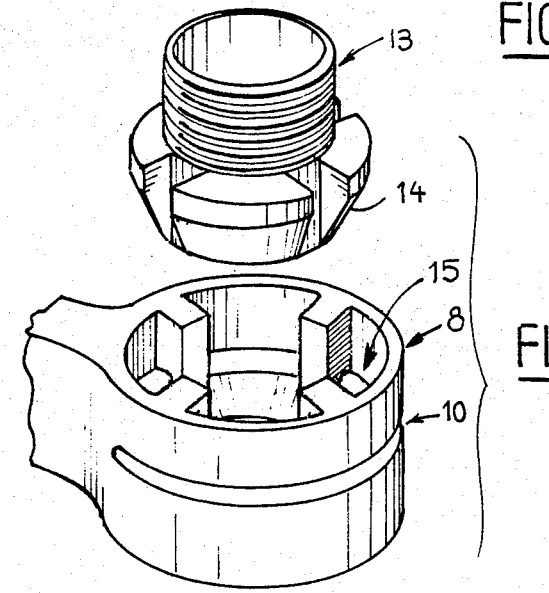

A better understanding of the invention will be had from the following description which is given solely by way of example with reference to the accompanying drawings, in which:

FIGS. 1a and 1b are semi-sectional views of a control device according to the invention in which a chuck included in the construction of a device according to the invention is shown in its two end positions, and FIG. 2 is a perspective view of a control lever and a chuck forming part of the construction of a device according to the invention.

A part of a tube 1 of the frame or handlebar of a cycle has been shown in the drawings. Fixed by any suitable means on this tube is a support which, in the illustrated example, comprises a stud 2 brazed to the tube and including a base 3 and a cylindrical portion 4 provided with flat portions, as the case may be.

Fixed on this stud by a screw 5 cooperating with an internal screwthread 4a of the stud is an intermediate element 6 which constitutes a kind of adapter between the brazed stud and the remainder of the device. This intermediate element corresponds at its base to the shape of the tube and defines a cylindrical outer surface 7 acting as a guide for a control lever 8. The latter, which is only partly shown in drawing, is constituted in the conventional manner by an arm mounted on the support to rotate about the axis X—X and to which is attached the end of an actuating cable 9 for the derailleur.

For this purpose, the lever 8 includes a groove 10 for receiving a portion of this cable in which it is wound.

The control device according to the invention is also provided with first indexing means 11 for, as previously mentioned, determining with precision the various positions of the lever relative to the support corresponding to the establishment of various transmission ratios. To permit a user to adapt this device to the pitch between the sprockets of the freewheel, the device according to the invention further comprises adjusting means 12 for the radial distance between the bottom of at least a portion of the groove 10 and the axis X—X of the support.

These adjusting means advantageously comprise a chuck 13 interposed between the support and the lever 8 and including at least one projecting portion 14 having a variable cross-section, for example in the form of a ramp, extending in a direction parallel to the axis X—X of the support and adapted to be engaged in a corresponding cavity 15 provided in the lever, and with which communcates the groove 10 so as to constitute the bottom of the adjustable portion of groove. This chuck is thus connected to rotate with the lever but is axially movable relative to the latter under the action of a control knob 16 for adjusting this radial distance.

As can be seen in paritcular in FIG. 2, the chuck 13 for example has four projecting portions 14 disposed at 90° to one another and adapted to cooperate with four corresponding recesses 15 in the lever 8.

As illustrated in FIGS. 1a and 1b, this chuck is mounted to be movable in an adjusting travel between a first position and a second position for adjusting the radial distance between the bottom of this groove portion 10 and the axis X—X of the support. This results, in respect of the control of a derailleur, in a length of wound or unwound cable which is more or less great between the indexed positions determined by the first indexing means 11 for adapting the device to the pitch between the sprockets of the freewheel employed.

The control knob 16 is mounted to be rotatable relative to the support and has a tapped portion 16a adapted to cooperate with a screw threaded portion 13a of the chuck for the purpose of the shifting of the latter, and more particularly of the or each projecting portion 14 of this chuck relative to the groove 10 of the lever.

It should also be noted that second indexing means 17 are provided between the control knob 16 and the lever 8, these means will be described in more detail hereinafter.

The first indexing means 11 comprise, for example, at least one ball 18 disposed in a groove 6a in the support and more particularly in the intermediate element 6. This groove includes stop edges 6b adapted to maintain the ball in the groove and is parallel to the axis X—X of the support. The ball is biased by elastically yieldable means 19 toward the chuck 13 and is adapted to cooperate with corresponding grooves, for example 13b, in the chuck, for determining the indexed positions of the lever relative to the support. Advantageously, the indexing means include two diametrically opposed balls.

The grooves 13b of the chuck are provided on the inner surface of the latter and disposed parallel to the axis X—X of the support, at a given distance from each other, thus defining indexed positions for establishing the various transmission ratios. One of the ends of the or each of the elastically yieldable means 19, for example constituted by resilient washers of the Belleville type, bears against a washer 20 which bears against a bearing surface 16b on the control knob 16. Advantageously, the washer 20 has at least one projecting portion 20a extending in the groove 6a of the support for locking the latter against rotation but permitting its displacement in a direction parallel to the axis X—X of the support.

The other end of the elastically yieldable means 19 bears against the ball 18, and the wall 6c of the groove 6a of the support opposed to these elastically yieldable means is inclined and is in the form of a guide ramp which guides the ball toward the chuck 13. As the chuck is connected to the lever and the support is fixed in position, the indexed positions of the lever are therefore determined when the ball 18 abuts against the bottom of a groove 13b of the chuck as shwown in FIG. 1a. When the lever is shifted (FIG. 1b), the ball is urged into the groove 6a of the support by the edges of the groove 13b in opposition to the action of the elastically yieldable means 19 until the ball can engage in another groove of the chuck and thus determine a new indexed position of the lever relative to the support.

To permit a precise positioning of the chuck, and particularly of the or each projection portion of the latter, relative to the groove of the lever, and thus adjust with precision the length of wound or unwound cable between the indexed positions, the second indexing means 17 determine the indexed positions of the control knob 16 relative to this lever. These indexing means 17 advantageously comprise a washer 21 disposed between the lever and the control knob. This washer has at least one flange 21a which connects it to rotate with the lever and at least one elastically yieldable boss 22 adapted to cooperate with corresponding cavities, for example 23, in the control knob for determining indexed positions of the knob relative to the lever.

This enables the user to very easily adapt the control device to freewheels whose sprockets have different pitches.

What is claimed is:

1. A control device for a cycle derailleur comprising a support for fixing to a part of a frame or handlebar of a cycle, a control lever having a groove and mounted to be rotatable relative to the support about an axis, an actuating cable attached to said lever and received in said groove, and first indexing means for determining indexed positions of the lever relative to the support, said control device further comprising means for adjusting a radial distance between a bottom of at least a portion of said groove and said axis.

2. A device according to claim 1, wherein said adjusting means comprise a cavity defined in the lever, a chuck interposed between the support and the lever and connected to rotate with the lever and including at least one projecting portion having a variable cross-section and engageable in said cavity in the lever, the groove communicating with said cavity so as to constitute said bottom of said adjustable portion of the groove, the chuck being mounted to be axially movable relative to the support, and a control knob associated with the chuck for moving the chuck and adjusting the radial distance between said movable portion of said groove and said axis.

3. A device according to claim 2, wherein the chuck has four of said projecting portion disposed at 90° to one another and respectively cooperative with four of said cavity in the lever.

4. A device as claimed in claim 2, wherein the control knob is rotatable relative to the support and the chuck includes at least one screw-threaded portion, and the control knob has a tapped portion cooperative with said screw-threaded portion for shifting the control knob relative to said groove of the lever.

5. A device according to claim 2, further comprising second indexing means between the control knob and the lever.

6. A device according to claim 5, wherein said second indexing means comprise a washer which is disposed between the lever and the control knob, connected to rotate with the lever and includes one elastically yieldable boss, cavities in the control knob corresponding to said washer and cooperative with said washer for determining indexed positions of the control knob relative to the lever and therefore precise positions of the chuck relative to said groove in the lever.

7. A device according to claim 2, wherein said at least one projecting portion of the chuck is in the form of a ramp.

8. A device according to claim 1, wherein the first indexing means comprise a groove in the support parallel to said axis, at least one ball disposed in said groove in the support, elastically yieldable means for biasing said ball toward the chuck, the chuck having grooves and said ball being cooperative with said grooves in the chuck for determining indexed positions of the lever relative to the support.

9. A device according to claim 8, wherein said first indexing means comprise two of said ball in diametrically opposed relation to each other relative to said axis.

10. A device according to claim 8, comprising a washer which is movable in a direction parallel to said axis, and a bearing surface on the control knob against which surface the washer bears, an end of the elastically yieldable means bearing against the washer and an opposite end of the elastically yieldable means bearing against the ball, and a wall of the groove of the support opposed to the elastically yieldable means being in the form of a guide ramp for guiding the ball toward the chuck.

11. A device according to claim 8, wherein the support comprises a stud rigid with said part of the frame or handlebar of the cycle and an intermediate element in which said groove of the support is provided is fixed in said stud.

* * * * *